A. H. WYATT.
COMBINED COMPASS AND TAPE LINE.
APPLICATION FILED AUG. 4, 1909.
980,730.
Patented Jan. 3, 1911.
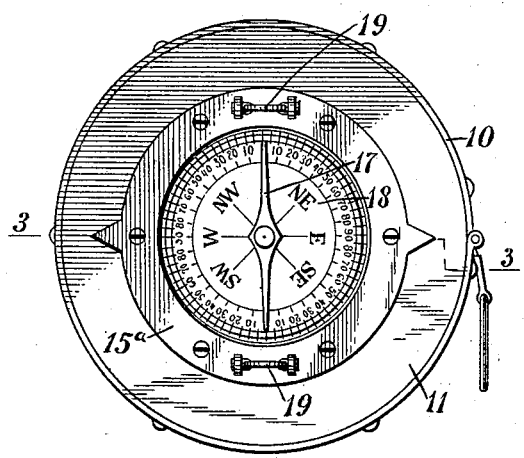
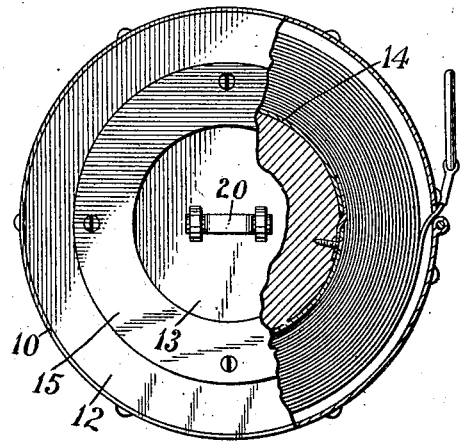
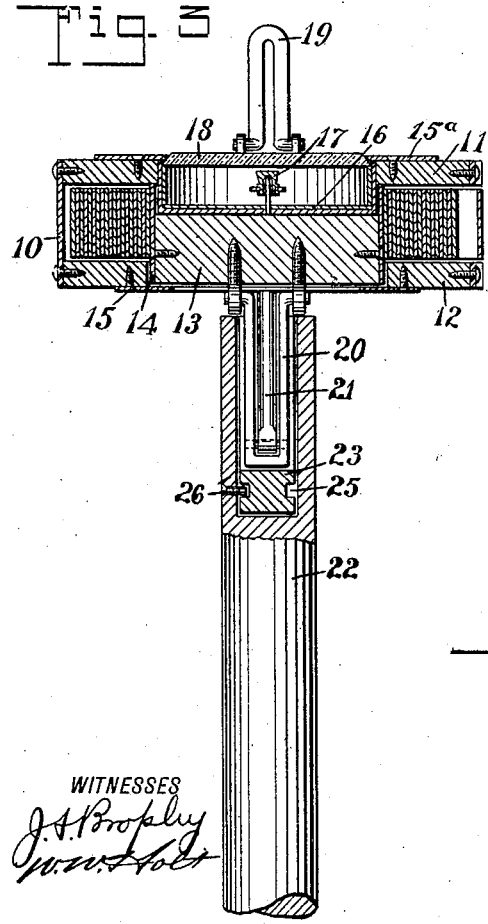
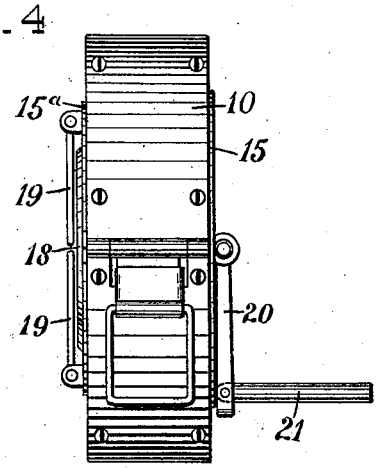
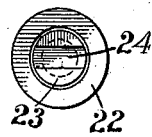
WITNESSES
INVENTOR
Albert H. Wyatt.
BY
ATTORNEYS

UNITED STATES PATENT OFFICE.

ALBERT H. WYATT, OF PEARL, IDAHO, ASSIGNOR OF ONE-HALF TO WILLIAM E. MYERS, OF PEARL, IDAHO.

COMBINED COMPASS AND TAPE-LINE.

980,730.

Specification of Letters Patent.

Patented Jan. 3, 1911.

Application filed August 4, 1909. Serial No. 511,193.

*To all whom it may concern:*

Be it known that I, ALBERT H. WYATT, a citizen of the United States, and a resident of Pearl, in the county of Boise and State of Idaho, have invented a new and Improved Combined Compass and Tape-Line, of which the following is a full, clear, and exact description.

The invention relates to a combined compass and tape line, so assembled as to provide a simple and convenient appliance to locate and lay out mining claims and trace lines in general, thus providing for certain work a substitute for a transit.

The invention in a general way consists of a casing having a compass at the top and a tape line arranged below or around the compass, the casing being further provided with sights in diametrical alinement therewith to direct the lineman in the proper course.

Reference is to be had to the accompanying drawings forming a part of this specification, in which similar characters of reference indicate corresponding parts in all the views.

Figure 1 is a plan of the combined compass and tape line constructed in accordance with my invention; Fig. 2 is an inverted plan of the same partly in horizontal section; Fig. 3 is a central vertical section of the instrument substantially on the line 3—3 of Fig. 1, the instrument being shown supported, as when in use; Fig. 4 is an edge view of the instrument, with the winding stem in position to wind up the tape; and Fig. 5 is a plan of the support with the instrument removed.

The casing of the instrument is construct ed of a peripheral band 10, a top head 11 and a bottom head 12, the band being attached to the edges of the heads by screws or other suitable means, and each head having a central opening, with the opening in the bottom head slightly larger than the opening in the top head, to admit of the passage into the casing from the under side of a tapered reel or drum which consists of a central spool 13 having a peripheral band 14 suitably secured thereto, the band 14 being of slightly greater width than the spool 13 to bear against the under side of the upper head 11. The under face of the spool 13 and bottom edge of the band 14 are substantially flush and are arranged in a plane with or slightly above the under face of the head 12, the drum being removably confined in this position in the casing by a ring 15 detachably secured to the under face of the head 12, the internal diameter of the ring being such as to overlap the spool, as clearly shown in Fig. 3.

Within the central opening of the head 11 a compass is fitted into the casing, consisting of a thimble 16 having an inner lining provided with the usual graduations, a needle 17, and a crystal 18 covering the thimble, the thimble extending from the upper face of the head 11 to the upper face of the spool 13, in which position it is removably held against vertical displacement by a ring 15ª detachably secured to the upper head 11 and extending over the edge of the thimble 16 and crystal 18.

In diametrical alinement with the compass, preferably alining with the points marked North and South, are sights 19, each preferably constructed in the nature of a wire loop, with the ends of the wire turned outwardly and hinged to the top of the casing, on which they are foldable when not in use. The tape drum is provided with a winding key composed of a wire loop 20 having its ends outwardly turned and hinged in eyes extending from the under face of the spool 13 at each side of the center, and a handle 21 hinged in the outer end of the loop. When the parts of the winding key are disposed as shown in Fig. 4, the drum is easily revolved in a direction to wind up the tape.

A support for the instrument is preferably made in the form of a walking stick or cane 22 having a tubular upper end, in which is revolved or retained a stub shaft 23, the shaft having a longitudinal slot 24 to receive the winding key when the same is folded and turned from the bottom of the casing, as illustrated in Fig. 3. The stub shaft 23 is revolubly held within the cane by providing the shaft with an annular groove 25 and engaging the same with the point of a screw 26 threaded into the side of the cane or by any other well known mechanical expedient.

With the instrument mounted as shown in Fig. 3, the tape may be withdrawn from the drum without the casing turning. The operator after locating the instrument at the point from which the measurement is to be taken, determines on the course by means of the compass and is enabled to direct the linemen in this course with approximate accuracy, by the use of the sights 19.

Having thus described my invention, I claim as new and desire to secure by Letters Patent:

1. The combination of a tape measure having a winding key, a compass carried by the tape measure at the side opposite to the said key, a support, and a revoluble member carried by the support, having means to receive the key and support the tape measure and compass.

2. The combination of a tape measure, a winding key for the measure, hinged thereto and having an operating handle foldable within the inner portion of the key, and a stick to support the measure, having a stub shaft revolubly mounted in the upper portion thereof provided with a longitudinal slot to receive the key.

3. The combination of a casing having top and bottom heads, each provided with a central opening, a drum arranged within the casing and extending into the opening of the bottom head, a tape line passing from the drum to the outside of the casing, a compass arranged within the casing and extending into the opening in the top head, and rings detachably secured to the outer faces of said heads and respectively overlapping the compass and the drum.

In testimony whereof I have signed my name to this specification in the presence of two subscribing witnesses.

ALBERT H. WYATT.

Witnesses:
FREDERICK R. CRAWFORD,
JAMES B. CARHART.